UNITED STATES PATENT OFFICE.

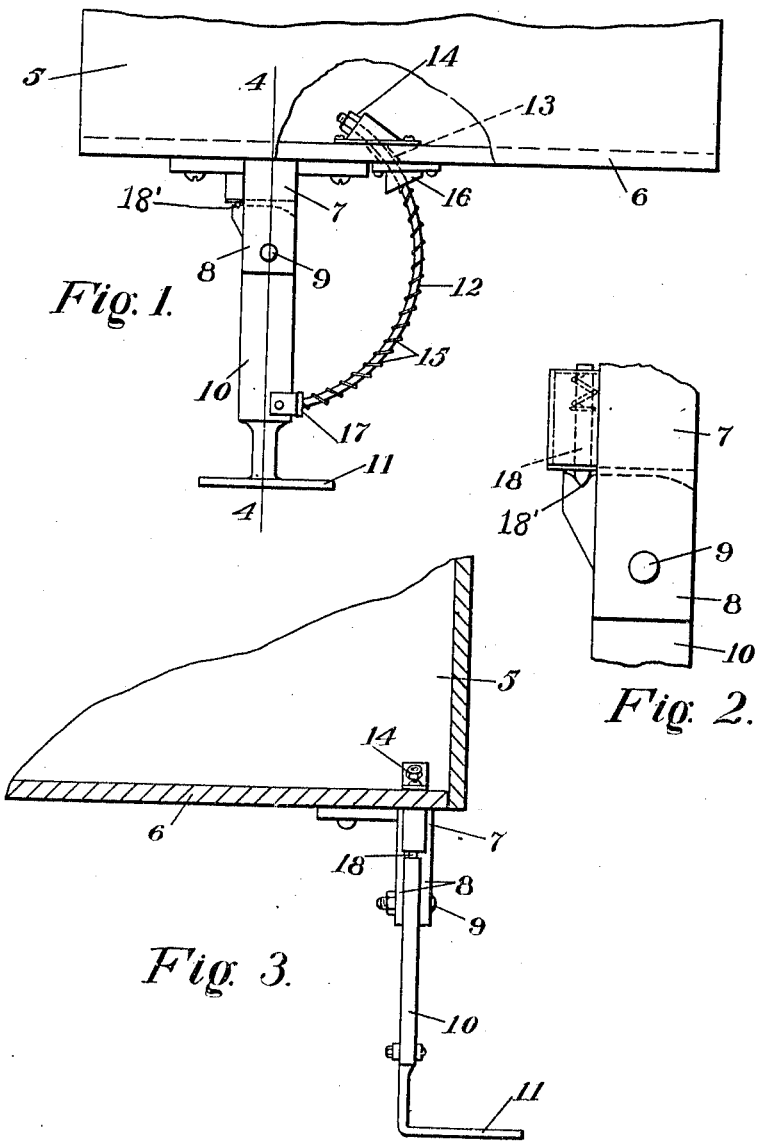

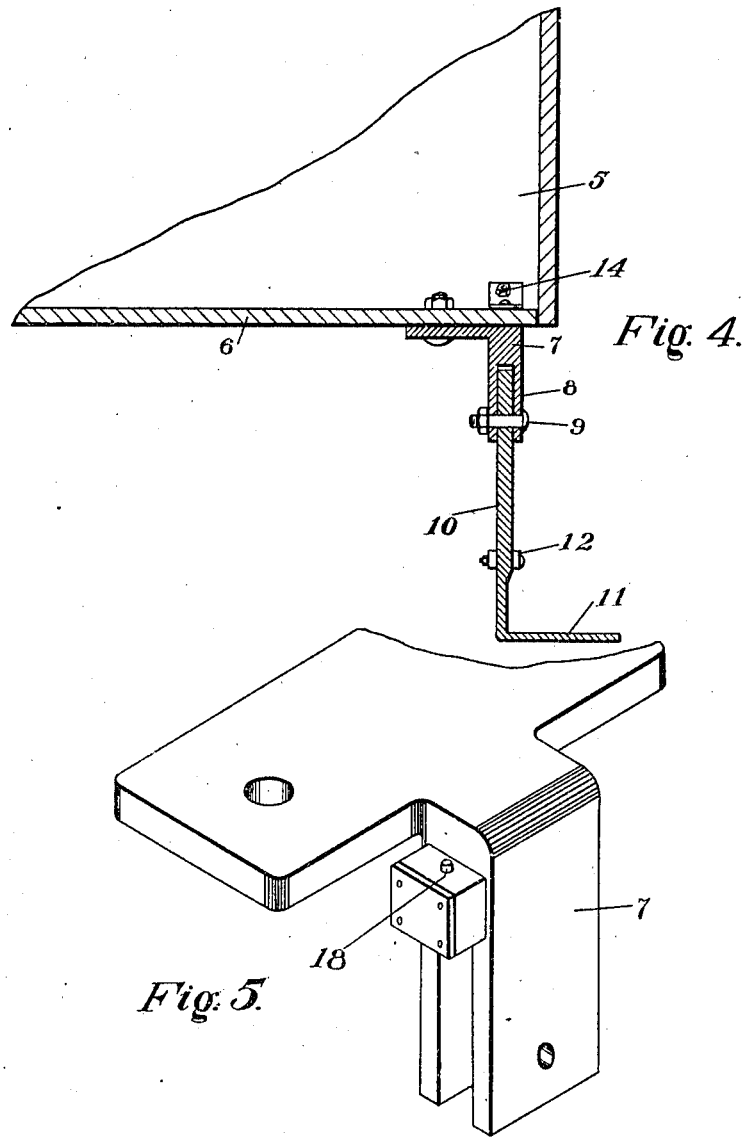

ALBERT L. BURNS, OF MILL CREEK, OKLAHOMA.

VEHICLE-STEP.

956,933.  Specification of Letters Patent.  Patented May 3, 1910.

Application filed April 20, 1909. Serial No. 491,079.

*To all whom it may concern:*

Be it known that I, ALBERT L. BURNS, a citizen of the United States, residing at Mill Creek, in the county of Johnston, State of Oklahoma, have invented certain new and useful Improvements in Vehicle-Steps; and I do hereby declare the following to be a full, clear, and exact description of the invention, such as will enable others skilled in the art to which it appertains to make and use the same.

The invention relates to a vehicle step and more particularly to the class of pivotal steps for vehicles.

The primary object of the invention is the provision of a vehicle step which is pivotally supported upon a vehicle so as to permit the said step to automatically trip when contacting with an obstruction or the like so as to prevent injury to the step.

Another object of the invention is the provision of a vehicle step in which the same is pivotally suspended from the vehicle body and is maintained in operative position by tension means and is adapted for swinging movement when contacting with an obstruction so that the said step will pass over the same without injury to it or the vehicle.

A further object of the invention is the provision of a vehicle step which is simple in construction; thoroughly efficient in operation and inexpensive in the manufacture.

With these and other objects in view the invention consists in the construction, combination and arrangement of parts as will be hereinafter more fully described in detail, illustrated in the accompanying drawings, which disclose the preferred form of embodiment of the invention, and as brought out in the appended claims.

In the drawings: Figure 1 is a fragmentary side elevation of the vehicle body with the invention applied thereto. Fig. 2 is an enlarged fragmentary detail view. Fig. 3 is a vertical sectional view. Fig. 4 is a sectional view on the line 4—4 of Fig. 1. Fig. 5 is a detail perspective view of the hanger.

Similar reference characters indicate corresponding parts throughout the several views in the drawings.

In the drawings, the numeral 5 designates a vehicle body of the usual construction having a bottom 6 to the underface of which is secured a depending hanger 7 the latter being bifurcated to form spaced parallel extensions or arms 8 containing near their lower ends suitable perforations for the receptacle of a pivot bolt 9 which pivotally connects between the said arms or extensions for swinging movement a standard or shank 10 of a step 11.

Pivotally connected to the standard 10 a considerable distance above the step 11 is the lower end of a spring actuated connecting rod or brace 12 which latter is adapted to hold the step normally in proper position for use. The said rod or brace 12 is of curved formation and extends upward and rearwardly with respect to the vehicle body 5 and passes through an opening 13 in the bottom 6 of the vehicle body. Connected to the upper free end of the rod or brace 12 is an adjusting nut 14 and supported by this rod is a coiled expansion or resetting spring 15 the same encircling the rod or brace 12 and having one end bearing against a washer 16 loosely surrounding the rod or brace and resting against the underface of the bottom and the other end of said spring having its bearing against a fixed collar 17 on the said rod or brace.

Formed on the hanger 7 in the path of movement of the upper end of the standard 10 is a spring catch member 18 the latter adapted to engage a notch 18' in an offset formed on the standard 10 to normally hold the same in alinement with the hanger. However upon the step or standard 10 contacting with an obstruction the said standard will be swung on its pivot rearwardly with respect to the vehicle body so that its upper free end will trip the spring catch member 18 to permit the step to pass over the obstruction without injury to it or the vehicle.

When the step is swung rearward it will compress the expansion spring 15 and which latter will return the step to its normal position as soon as the same has passed beyond an obstruction.

It is obvious the spring catch member 18 serves to hold the standard 10 from rattling during the travel of the vehicle and also prevents the said standard against accidental displacement when not contacting with an obstruction.

What is claimed is—

1. A device of the class described comprising a hinged step adapted to swing rearward and having an offset portion provided with a notch, an inclined rod extending upward from the step and adapted to pass freely through the body of the vehicle; a spring disposed on the rod and holding the step normally in proper position for use, and a spring catch normally engaging the notch to aid in holding the hinged step in normal position.

2. A device of the class described comprising a hanger, a step hinged to said hanger and adapted to swing rearward and having a notch in its upper extremity, a curved brace rod extending upward and rearward from the step and adapted to pass freely through the bottom of a vehicle, an expansion spring coiled about said brace rod to hold the step in normal operative position, an adjusting nut mounted at the free end of the brace rod, and a spring catch member on said hanger and arranged in the path of movement of the step and adapted to engage the notch therein to aid in holding the step in normal operative position.

In testimony whereof, I affix my signature, in presence of two witnesses.

ALBERT L. BURNS.

Witnesses:
W. C. ENBAUN,
B. H. GRAVES.